Patented Apr. 26, 1927.

1,626,168

UNITED STATES PATENT OFFICE.

FRITZ STRAUB, OF BASEL, SWITZERLAND, ASSIGNOR TO THE FIRM: SOCIETY OF CHEMICAL INDUSTRY IN BASLE, OF BASEL, SWITZERLAND.

DYESTUFFS AND PROCESS OF MAKING SAME.

No Drawing. Application filed January 29, 1926, Serial No. 84,756, and in Switzerland February 16, 1925.

The present invention relates to new acid dyestuffs containing chromium, valuable for the production of fast shades on the animal fibre. It comprises the new products, the process of making same, and the material dyed with the new dyestuffs.

It has been found that valuable new acid wool dyestuffs containing chromium may be obtained by treating the azo dyestuff from diazotized 6-nitro-2-amino-1-phenol-4-sulfonic acid and β-naphthol corresponding with the following formula:

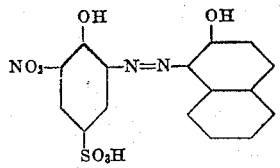

with agents yielding chromium, such as the derivatives of the trivalent chromium.

There are thus obtained new dyestuffs which have to be considered as complex chromium compounds of the azo dyestuffs corresponding with the formula

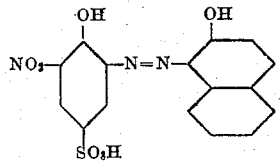

and which form black powders dissolving in water with red-violet-black, in dilute caustic soda solution with violet-black coloration, dyeing wool from an acid bath reddish-black shades with excellent properties of fastness.

Example.

41.1 parts of the dyestuff made from diazotized 6-nitro-2-amino-1-phenol-4-sulfonic acid and β-naphthol are dissolved in 1000 parts of boiling water, the whole is then treated with 15.2 parts of chromium oxide in form of a chromium fluoride solution of 4% strength and boiled for some time in a reflux apparatus after addition of some glass powder. The new dyestuff containing chromium is isolated by evaporation and salting out.

Similar products are obtained if instead of chromium fluoride, chromium acetate, chromium formate or freshly precipitated neutral chromium hydroxide are employed.

What I claim is:

1. A process for the manufacture of new acid wool dyestuffs containing chromium by treating the azo dyestuff from diazotized 6-nitro-2-amino-1-phenol-4-sulfonic acid and β-naphthol with derivatives of the trivalent chromium.

2. A process for the manufacture of new acid wool dyestuffs containing chromium by treating the azo dyestuff from diazotized 6-nitro-2-amino-1-phenol-4-sulfonic acid and β-naphthol with the salts of the trivalent chromium.

3. A process for the manufacture of new acid wool dyestuffs containing chromium by treating the azo dyestuff from diazotized 6-nitro-2-amino-1-phenol-4-sulfonic acid and β-naphthol with chromium fluoride.

4. As new products the herein described acid wool dyestuffs containing chromium which have to be considered as complex chromium compounds of the azo dyestuffs corresponding with the formula:

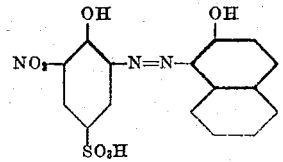

which products form black powders dissolving in water with red-violet-black, in dilute caustic soda solution with violet-black coloration, dyeing wool from an acid bath reddish-black shades with excellent properties of fastness.

5. Material dyed with the dyestuffs of claim 4.

In witness whereof I have hereunto signed my name this 16th day of January 1926.

FRITZ STRAUB.